US005742466A

United States Patent [19]

Kram

[11] Patent Number: 5,742,466

[45] Date of Patent: Apr. 21, 1998

[54] POWER OUTLET DEVICE WITH MULTIPLE INDIVIDUAL TIMER CONTROLLED RECEPTACLES

[75] Inventor: Harvey Kram, Tamarac, Fla.

[73] Assignee: Leviton Manufacturing Co., Inc., Little Neck, N.Y.

[21] Appl. No.: 798,009

[22] Filed: Feb. 12, 1997

[51] Int. Cl.$^6$ .................. H02H 1/00

[52] U.S. Cl. .................. 361/118; 361/111; 361/115

[58] Field of Search .................. 361/56, 58, 111, 361/117, 118, 115; 307/38; 364/492

[56] References Cited

U.S. PATENT DOCUMENTS

| | | | |
|---|---|---|---|
| 4,579,405 | 4/1986 | Hirooka | 339/14 |
| 4,930,047 | 5/1990 | Peterson | 361/395 |
| 5,102,345 | 4/1992 | Stanwick et al. | 361/50 |
| 5,198,955 | 3/1993 | Willner | 361/42 |
| 5,207,594 | 5/1993 | Olson | 439/490 |
| 5,278,771 | 1/1994 | Nyenya | 364/492 |
| 5,397,930 | 3/1995 | Nilssen | 307/150 |

*Primary Examiner*—Jeffrey A. Gaffin
*Assistant Examiner*—Stephen Jackson
*Attorney, Agent, or Firm*—Paul J. Sutton

[57] ABSTRACT

A multiple receptacle power outlet device where one or more of the receptacles is connected to individual timers which can be set independently to independently control the on/off cycles of its associated receptacle without regard to the other timers. One or more continuous on receptacles can also be included and the entire device powered through a surge suppressor, noise filter and a single pole, single throw master switch. The timers can be mechanical or electronic and LED's provided at each receptacle to indicate when AC current is supplied to an electrical device plugged into the associated receptacle.

16 Claims, 1 Drawing Sheet

POWER OUTLET DEVICE WITH MULTIPLE INDIVIDUAL TIMER CONTROLLED RECEPTACLES

BACKGROUND OF THE INVENTION

1. Field of the Invention

The invention is directed to multiple receptacle outlet strips and more particularly to a multiple receptacle outlet strip where one or more of the receptacles are controlled by individual timers, one associated with each receptacle to be controlled.

2. Description of the Prior Art

Multiple receptacle outlet centers (hereafter sometimes referred to as "MROC") are available in a number of configurations, the most usual of which includes a number of receptacles placed in a housing in the form of a strip or circular shape. A power cord connects to each of the receptacles and permits the coupling of the receptacles to an AC power source such as a wall mounted receptacle. This permits the expansion of a single receptacle of a duplex receptacle into, for example, six receptacles. A resettable circuit breaker is often included to prevent excessive currents being drawn by devices plugged into the MROC. An on/off switch with a lamp in the switch or elsewhere shows when the MROC is available for service. A device of this type is shown in U.S. Pat. 4,930,047 issued May 29, 1990.

This type of MROC is useful for multiple tools or appliances but is not sufficient protection for computers, VCR's, sophisticated TV's, sound systems and the like which can be damaged by excessive current or voltage spikes. To protect these devices a surge suppressing circuit can be added as also described in the '047 patent. Capacitors can also be added to filter noise from the power supply system.

Ground fault circuit interrupter can also be added as shown in U.S. Pat. No. 5,198,955 issued Mar. 30, 1993 and receptacles protected by conducting rings about the prong slots of the receptacle coupled to a GFCI as shown in U.S. Pat. No. 5,102,345 issued Apr. 7, 1992.

The MROC may be connected to a receptacle controlled by a programmable timer wall switch as shown in U.S. Pat. No. 5,397,930 issued Mar. 14, 1995. The problem with such a device is that all of the receptacles are turned on or off at the same time. It is not possible to leave some of the receptacles on, and some off, turn individual receptacles on and off at different times and cycle the individual receptacles at different intervals.

SUMMARY OF THE INVENTION

The instant invention overcomes the difficulties noted above with respect to prior art devices by providing a MROC in which one or more of the available receptacles may be controlled by its individual programmable timer which can be set independently of the other available programmable timers so that each receptacle will provide AC power to a device plugged into such receptacle according to the needs of such device. It is an object of this invention to provide a multiple receptacle outlet center in which at least one receptacle is controlled by a programmable timer.

It is another object of this invention to provide a multiple receptacle outlet center in which one or more receptacles are controlled by their individual programmable associated timer.

It is still another object of this invention to provide a multiple receptacle outlet center in which one or more receptacles are controlled by their individual programmable associated timer independent of any other timer.

Other objects and features of the invention will be pointed out in the following description and claims and illustrated in the accompanying drawings, which disclose, by way of example, the principles of the invention, and the best mode which is presently contemplated for carrying them out.

DESCRIPTION OF THE PREFERRED EMBODIMENT

Figure 1:
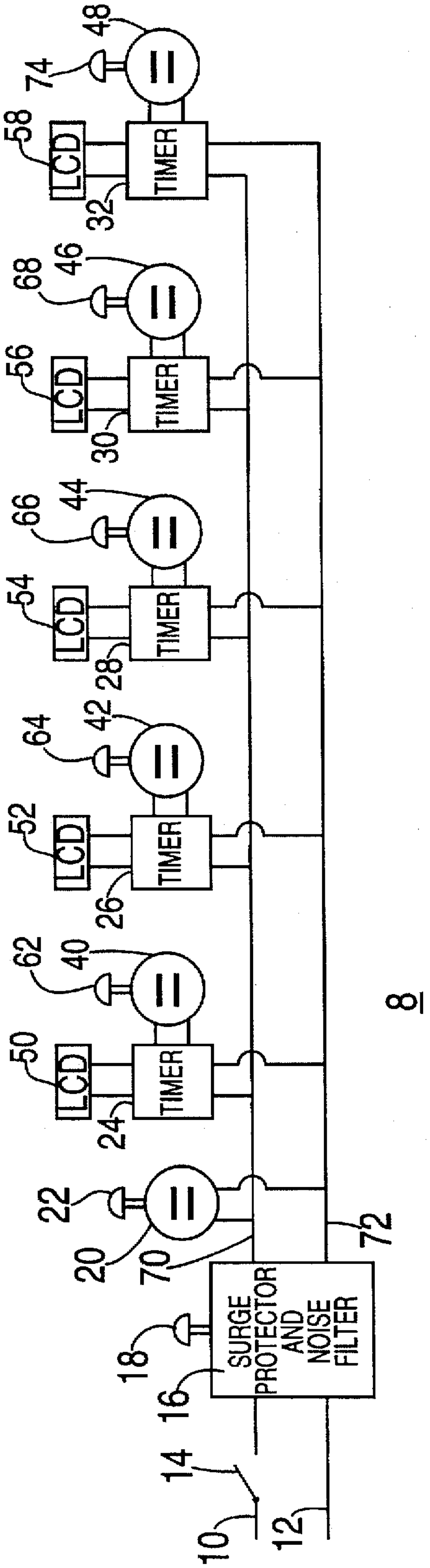
FIG. 1 is an electrical schematic diagram of a power outlet strip with individual timer controlled receptacles constructed in accordance with the concepts of the invention.

Turning now to the drawing, electrical power is introduced to the power outlet strip (hereinafter sometimes referred to as "POS") 8 via conductors 10 and 12 which may terminate in a plug (not shown) which can be inserted into a wall mounted receptacle or hard wired to AC power lines (not shown). A single pole, single throw switch 14 in conductor 10 serves as a master switch to apply to or remove power from the POS 8 assuming that conductor 10 is the hot or phase line as shown by a black conductor according to conventional wiring practice. If the conductor 12 is the hot line then the switch 14 would be placed in conductor 12. Conductors 10 and 12 extend to a surge protector and noise filter 16 which may include a surge suppressor such as a Leviton Catalog No. 5280 and filter capacitors. A light emitting diode (LED) 18 coupled to the surge suppressor and noise filter 16 provides a visible indication that AC current is flowing to the receptacles.

A first receptacle 20 is connected directly across the output conductors 70 and 72 of the surge protector and noise filter 16 and can provide a continuous flow of AC current to any electrical device plugged into receptacle 20. An LED 22 is coupled to receptacle 20 and will light to slow the flow of AC current to the external device plugged into receptacle 20.

Receptacle 40 is connected to the conductors 70 and 72 through a programmable timer 24 which is coupled to a touch-sensitive liquid crystal display (LCD) mini-screen 50. An LED 62 is coupled to the receptacle 40 and will show when AC current is flowing to an external electrically operated device plugged into receptacle 24. By touching the LCD mini-screen 50, the timer can be programmed to go on at a set time, go off at a set time, go off after a set time, or may have multiple on/off cycles.

A series of further receptacles 42, 44, 46 and 48 are coupled to the conductors 70 and 72 through a series of programmable timers 26, 28, 30 and 32, respectively, each of which has its own mini-screen 52, 54, 56 and 58, respectively. Each of the programmable timers 26, 28, 30 and 32 are thus able to be set independently of each other and of timer 24 and can show a different on/off pattern. Thus an external device, such as a lamp plugged into receptacle 40 can be made to light at 6:00 pm and be extinguished at 1:00 am, while a lamp plugged into receptacle 42 lights at 8:00 pm and is extinguished at 1:00 am while a lamp plugged into receptacle 44 can be lit at 7:00 pm and made to extinguish at 9:00 pm. A lamp plugged into receptacle 46 could be made to light at 6:00 am and be extinguished at 9:00 am and relight at 8:00 pm and extinguish at 11:00 pm. An LED 64, 66, 68 and 74 is connected to the receptacles 42, 44, 46 and 48, respectively, to show when AC current is flowing in their respective receptacles.

As an alternative, the electronic programmable timers 24, 26, 28, 30 and 32 with their respective LCD mini-screens 50, 52, 54, 56 and 58 could be replaced by individual programmable mechanical or electrical clock-work type timers set by dials, knobs, slides or push-buttons.

While there have been shown and described and pointed out the fundamental novel features of the invention as applied to the preferred embodiment as is presently contemplated for carrying them out, it will be understood that various omissions and substitutions and changes of the form and details of the device illustrated and in its operation may be made by those skilled in the art, without departing from the spirit of the invention.

I claim:

1. A power outlet device having receptacles into which electrical devices may be plugged to receive AC current therefrom comprising:

a) a first and a second electrical conductor adapted to coupled to a source of AC current;

b) at least one first receptacle directly connected across said first and second electrical conductors to provide continuous AC current to an electrical device plugged into said first receptacle;

c) at least one second receptacle; and d) at least one discrete timer, one for each of said at least one second receptacle, each of said at least one timer connected directly across said first and said second electrical conductors and directly to an associated at least one second receptacle to provide AC current to an electrical device plugged into said at least one second receptacle in accordance with the setting of said associated timer.

2. A power outlet device as defined in claim 1, wherein said at least one first receptacle has an LED coupled thereto to show when AC current is flowing to an electrical device plugged into said at least one first receptacle.

3. A power outlet device as defined in claim 1, wherein said at least one second receptacle has an LED coupled thereto to shown when AC current is flowing to an electrical device plugged into said at least one second receptacle.

4. A power outlet device as defined in claim 1, wherein said at least one first receptacle has a first LED coupled thereto to show when AC current is flowing to an electrical device plugged into said at least one first receptacle and said at least one second receptacle has a second LED coupled thereto to show when AC current is flowing to an electrical device plugged into said at least one second receptacle.

5. A power outlet device as defined in claim 1, further comprising a noise filter connected between said source of AC current and said first and second electrical conductors.

6. A power outlet device as defined in claim 1, further comprising a surge protector connected between said source of AC current and said first and second electrical conductors.

7. A power outlet device as defined in claim 6, further comprising a single pole, single throw switch coupled between said source of AC current and said surge protector.

8. A power outlet device as defined in claim 6, further comprising a noise filter connected between said surge protector and said first and second electrical conductors.

9. A power outlet device as defined in claim 8, further comprising a single pole, single throw switch coupled between said source of AC current and said surge protector.

10. A power outlet device as defined in claim 1, wherein said at least one timer is programmable with respect to its on and off cycles.

11. A power outlet device as defined in claim 10, wherein said at least one first receptacle has an LED coupled thereto to show when AC current is flowing to an electrical device plugged into said at least one first receptacle.

12. A power outlet device as defined in claim 10, wherein said at least one second receptacle has an LED coupled thereto to shown when AC current is flowing to an electrical device plugged into said at least one second receptacle.

13. A power outlet device as defined in claim 10, wherein said at least one first receptacle has a first LED coupled thereto to show when AC current is flowing to an electrical device plugged into said at least one first receptacle and said at least one second receptacle has a second LED coupled thereto to show when AC current is flowing to an electrical device plugged into said at least one second receptacle.

14. A power outlet device as defined in claim 10, wherein said programmable timer is mechanical.

15. A power outlet device as defined in claim 10, wherein said programmable timer is electronic.

16. A power outlet device as defined in claim 15, wherein said programmable timer is set by means of an LCD mini-screen coupled to each of said at least on programmable timer.

* * * * *